United States Patent [19]

Kubo et al.

[11] 4,383,808
[45] May 17, 1983

[54] VULCANIZING PRESS FOR MANUFACTURING TIRES

[75] Inventors: Masayoshi Kubo; Akira Hasegawa; Katsuyoshi Sakaguchi; Shozo Fukuda, all of Nagasaki, Japan

[73] Assignee: Mitsubishi Jukogyo Kabushiki Kaisha, Japan

[21] Appl. No.: 386,332

[22] Filed: Jun. 8, 1982

[30] Foreign Application Priority Data

Jun. 10, 1981 [JP] Japan ..................... 56-88046

[51] Int. Cl.³ .......................... B29H 5/02; B29H 5/08
[52] U.S. Cl. ....................................... 425/47; 425/32; 425/590
[58] Field of Search ............... 425/28 R, 29, 30, 31, 425/32, 33, 35, 46, 47, 590, 451.2, 451.9

[56] References Cited

U.S. PATENT DOCUMENTS

| | | | |
|---|---|---|---|
| 2,198,493 | 4/1940 | Freeman | 425/47 X |
| 2,308,948 | 1/1943 | Bosomworth | 425/47 X |
| 2,424,915 | 7/1947 | Bosomworth et al. | 425/47 X |
| 2,987,770 | 6/1961 | Powell | 425/30 X |
| 3,465,387 | 9/1969 | Allard et al. | 425/590 X |
| 3,663,140 | 5/1972 | Hehl | 425/590 X |
| 3,859,015 | 1/1975 | O'Brien | 425/29 |
| 4,332,536 | 6/1982 | Singh et al. | 425/33 |

Primary Examiner—J. Howard Flint, Jr.
Attorney, Agent, or Firm—McGlew and Tuttle

[57] ABSTRACT

An improved vulcanizing press for manufacturing tires is disclosed which is constructed such that a molding die assembly is clamped by means of a plurality of hydraulic cylinder units, wherein the respective hydraulic cylinder units are provided with a booster for serving to pressurize hydraulic liquid to actuate a ram slidably contained in a hydraulic chamber and a pilot operated check valve for controlling supply of hydraulic liquid into said hydraulic chamber or discharge of the same therefrom.

1 Claim, 1 Drawing Figure

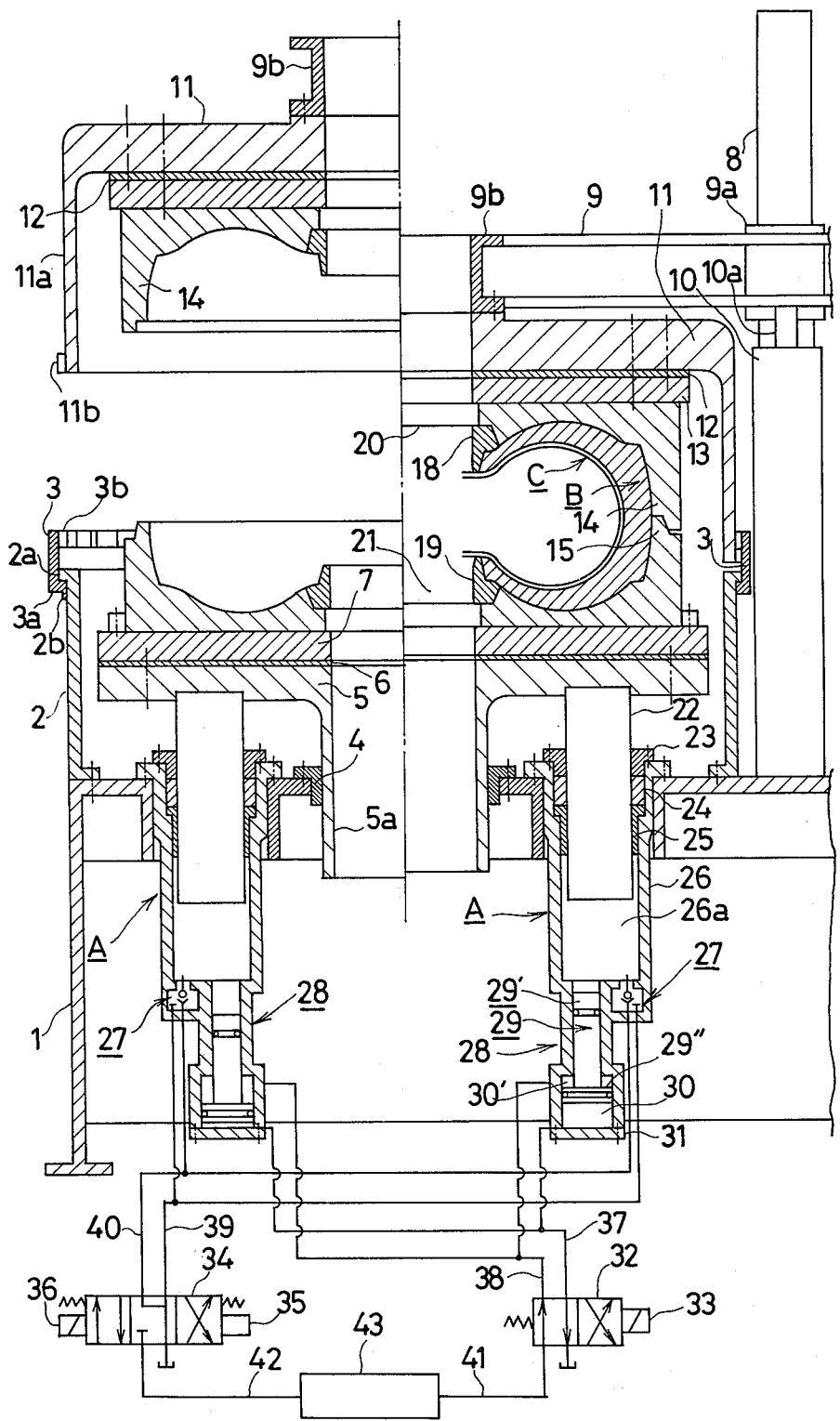

VULCANIZING PRESS FOR MANUFACTURING TIRES

The present invention relates to a platen type or dome type vulcanizing press for manufacturing tires for passenger cars, trucks, busses or the like.

As is well known, the conventionally vulcanizing press for manufacturing tires (hereinafter referred to merely as vulcanizing press) of the above-mentioned type is generally classified into a mechanical clamp vulcanizing press and a hydraulic clamp vulcanizing press, and any of them is designed to vulcanize a plural size of tires. First, the mechanical clamp vulcanzing press is usually constructed such that a constant distance is reached between the upper and lower beams when it is closed and thereby the upper and lower members are locked, and in order to allow the existing die assembly to be replaced with a new one having a different thickness a plurality of screws are arranged between the upper beam and the upper die half fastening member (bolster plate) so that they are rotated so as to cancel the difference in height with a predetermined die clamping force maintained. However, the mechanical clamp vulcanizing press has a drawback that the screws fail to be rotated due to dried and deteriorated lubricant as long as they are maintained in a wrong manner, because they are located in the vicinity of heating devices which serve for heating tires at a temperature of about 180° C. during vulcanization or they are extended through the heating devices. Another drawback of the mechanical clamp vulcanizing press is that there occurs a necessity for effecting readjustment every time when a new die assembly is mounted, which takes a long period of time and a plenty of manpoweres.

On the other hand, the hydraulic clamp vulcanizing press is free from the drawbacks inherent to the mechanical clamp vulcanizing press as described above as far as hydraulic cylinder units for clamping a die assembly are designed to have a sufficiently long stroke, but there is a danger that there occurs a trouble causing a damage or injury on an operator's body when hot heating medium having an elevated temperature of 180° C. and a high pressure such as steam, hot water or the like leaks from ruptured part of a bladder (made of rubber) held in a tire during vulcanization, said leakage taking place when the hydraulic cylinder units are operated in a wrong manner due to leakage of hydraulic liquid from the damaged or injuried piping and thereby the die assembly is widely opened.

Thus, the present invention is intended to obviate the drawbacks with the conventional vulcanizing press as described above. Specifically, the present invention consists in a vulcanizing press of the type which is constructed such that a molding die assembly is clamped by means of a plurality of hydraulic cylinder units, wherein the respective hydraulic cylinder units are provided with a booster for serving to pressurize hydraulic liquid to actuate a ram slidably disposed in a hydraulic chamber and a pilot operated check valve for controlling supply of hydraulic liquid into said hydraulic chamber or discharge of the same therefrom.

It is an object of the present invention to provide an improved vulcanizing press of the above-mentioned type which is entirely free from any trouble caused when a new die assembly having a different thickness is to be mounted.

It is other object of the present invention to provide a vulcanizing press of the type in which the die assembly can be clamped by the minimized stroke of the hydraulic cylinder units.

It is another object of the present invention to provide a vulcanizing press of the type which is easy to be operated.

It is still another object of the present invention to provide a vulcanizing press of the type in which vulcanization is effected safely.

Since a vulcanizing press in accordance with the present invention is constructed in the above-described manner, it is ensured that any difference in thickness of a new die assembly to be mounted is cancelled by actuating the pilot operated check valve which serves to control supply or discharge of hydraulic liquid into or from the hydraulic cylinder units. Thus, die replacement is effected without any particular difficult. Further, since an arrangement is made such that the locking mechanism for the upper and lower members is located at a predetermined position at any time when the vulcanizing press is closed, it is ensured that reliable locking is achieved by means of the simple locking mechanism.

Further, since an arrangement is made such that die clamping force is applied to the die assembly by means of the booster which is not affected directly by actuating of the pilot operated check valve, the booster has the minimized stroke which is kept constant irrespective of any thickness of the die assembly mounted on the vulcanizing press. This causes a substantially constant volume of hydraulic liquid to be maintained in the respective hydraulic cylinder units during vulcanization. Thus, it is ensured that an opening of the die assembly is minimized even when some trouble takes place with the bladder, whereby operation is performed safely without any rapture caused on the tire and the bladder during vulcanization.

Furthermore, since an arrangement is made such that a volume of hydraulic liquid maintained in the hydraulic cylinder unit is increased or decreased by actuating the pilot operated check valve and the respective hydraulic cylinder units are adapted to be actuated by means of the booster, it is possible that the hydraulic chamber in the hydraulic cylinder units is filled with another hydraulic liquid having a higher viscosity. As a result adjustment operation for die clamping force is performed in the optimum manner with the minimized leakage of hydraulic liquid.

Other objects and advantageous features of the present invention will be readily understood from the reading of the following description which has been prepared in connection with the single accompanying drawing.

The single accompanying drawing is a front view of a vulcanizing press for manufacturing tires, sectioned in a vertically extending plane including a center line thereof, wherein just a left half of the vulcanizing press is sectionally shown.

Now the present invention will be described in a greater detail with reference to the single accompanying drawing which illustrates a preferred embodiment of the present invention.

A platen type vulcanizing press for manufacturing tires in accordance with the present invention (hereinafter referred to merely as vulcanizing press) is symmetrically constructed in a twin type so that two pieces of tires are vulcanized simultaneously. Therefore only a left half of the vulcanizing press is shown for the purpose of simplification of illustration. It should be noted that the left part in the left half of the vulcanizing press is shown in a die open state, while the right part in the same is shown in a die closed state where a tire is subjected to vulcanization.

In the drawing reference numeral 1 designates a base and reference numeral 2 does a cylindrical lock sleeve bolted to said base 1. The lock sleeve 2 includes a flange 2a and a removable guide 2b along the upper end part thereof.

Reference numeral 3 designates a lock ring which includes a flange 3a on the inner wall of the lower end part thereof, said flange 3a being adapted to be slidably supported intermediate the flange 2a and the guide 2b. Further, the lock ring 3 includes a plurality of projections 3b on the inner wall of the upper part thereof, said projections 3b being located in an equally spaced relation along the upper periphery. An arrangement is made such that the lock ring 3 is rotated by means of an actuator (not shown).

Reference numeral 4 designates a bush bolted to the base 1 and reference numeral 5 does a disc-shaped lower bolster which includes a downwardly extending sleeve 5a on the lower side which is slidably fitted into said bush 4. The lower bolster 5 is lowered or raised up with the aid of a plurality of hydraulic cylinder units A which will be described later, said hydraulic cylinder units A being bolted to the base 1.

Reference numeral 6 designates an insulating plate and reference numeral 7 does a doughnut-shaped lower platen (hot plate) bolted to the lower bolster with the insulating plate 6 interposed therebetween, said lower platen being heated by heating medium which is supplied thereto via a piping (not shown).

Reference numeral 8 designates a guide column fixedly secured to the base 1. A beam 9 is slidably mounted on the guide column 8 with the aid of a guiding member such as bush or the like (not shown) firmly fitted into a boss 9a on the beam 9. Further, the base is provided with a hydraulic cylinder unit 10 fixedly mounted thereon, said hydraulic cylinder unit 10 including a piston rod 10 of which top end is fixed to the beam 9 so that the latter is lowered or raised by actuating the hydraulic cylinder unit 10. Alternatively, the hydraulic cylinder unit 10 may be replaced with other type of actuator such as motor driven screw mechanism or the like.

Reference numeral 11 designates an upper bolster bolted to a flange 9b at the left end part of the beam 9. It should be noted that the same upper bolster 11 is arranged oppositely to the aforesaid upper bolster 11 at the right-hand side of the vulcanizing press. The bolster 11 includes a cylindrical sleeve 11a extending downward therefrom and a plurality of projections 11b are formed on the outer wall of the lower end part of the sleeve 11a, corresponding to the projections 3b on the lock ring 3.

Reference numeral 12 designates an insulating plate and reference numeral 13 does a doughnut-shaped upper platen bolted to the upper bolster 11 with the insulating plate 12 interposed therebetween. An arrangement is made such that heating medium is supplied into the upper platen 13 via a piping (not shown).

Reference numeral 14 designates an upper die half bolted to the upper bolster 11 with the insulating plate 12 and the upper platen 13 interposed therebetween, reference numeral 15 does a lower die half bolted to the lower platen 17 in coaxial alignment with said upper die half 14, reference letter B does a tire which is now under vulcanization, reference letter C does a bladder (made of rubber), reference numeral 18 does an upper bead ring and reference numeral 19 does a lower bead ring.

The tire B is vulcanized by heating from the outside by means of both the upper and lower platens 7 and 13 fixedly secured to the upper and lower die halves 14 and 15 and heating also from the inside using heating medium having an elevated temperature and pressure which is introduced into the bladder C. The tread portion of the tire is molded to the required pattern at the same time when vulcanization is effected.

Reference numerals 20 and 21 designate a hollow space respectively in which a handling mechanism for the bladder C and a handling mechanism for the tire B (both of which are not shown in the drawing) are incorporated. It should be noted that a method of mounting the upper and lower bead rings 18 and 19 varies depending on the structure of the handling mechanisms. For instance, either of the upper and lower bead rings 18 and 19 may be integrally secured to the upper die half 14 or the lower die half 15.

In the illustrated embodiment the hydraulic cylinder units A for clamping both the upper and lower die halves 14 and 15 are constructed in the following manner.

Specifically, the respective hydraulic cylinder units A essentially comprise a ram 22 of which upper end is bolted to the lower bolster 5, a casing 26 slidably containing said ram 22 therein, a bush 25 fitted intermediate the casing 26 and the ram 22, a packing 24, a packing retainer 26 bolted to the casing 26, a pilot operated check valve 27 incorporated in the casing 26 and a booster 28 secured to the casing 26. Further, the booster 28 includes a piston 29 comprising a small diameter piston 29' and a large diameter piston 29" both of which are integrally secured to one another and slidably contained in the lower extension of the casing 26 and a cover 31 bolted to the lower end part of the casing 26. It should be noted that the pilot operated check valve 27 and the booster 28 should be not limited only to the arrangement in accordance with the illustrated embodiment where they are incorporated directly in the hydraulic cylinder unit A but they may be arranged in such a different manner that they are located separately therefrom.

Further, the hydraulic cylinder units A are provided with switching valves 32 and 34 adapted to be actuated by means of solnoids 33, 35 and 36, said switching valves 32 and 34 being in communication with a hydraulic liquid source 43 via pipings 41 and 42. Specifically, the switching valve 32 is connected to upper and lower chambers 30 and 30' in the booster 28 via pipings 37 and 38, whereas the switching valve 34 is connected to the pilot operated check valve 27 via pipings 39 and 40 which is in communication with the hydraulic chamber 26a in the casing 26.

It should be noted that the hydraulic cylinder units A should be not limited only to the illustrated ram type but they may be designed in a piston type with the hydraulic lines partly modified. Further, the switching valves 32 and 43 should be not limited only to the illustrated type where they are adapted to be directly actuated by means of the solenoid, but they may be designed in a pilot operated type. Furthermore, the hydraulic cylinder units A should be not limited only to the illustrated construction in which they are vertically arranged between the base 1 and the lower bolster 5, but they may be designed in an inverted type where they are fixedly secured to the upper bolster 11 in the opposite direction. In addition to this a single doughnut-shaped hydraulic cylinder unit may be replaced with the illustrated hydraulic cylinder units A including several pieces of rams arranged around the die assembly in an equally spaced relation.

As is apparent from the drawing, the vulcanizing press is designed in a so-called platen type where the tire B is heated from the outside in such a manner that thermal energy is transmitted from the upper and lower platens 7 and 13 through the upper and lower die halves 14 and 15 to the tire B to be vulcanized. Alternatively, the vulcanizing press may be designed in a so-called dome type where the die assembly is heated directly by a heating medium which is delivered thereto from the outside.

Now operation of the vulcanizing press constructed in the above-mentioned manner will be described below.

The left half of the drawing illustrates that the die assembly is in an opened state after a vulcanized tire (not shown) is removed therefrom and it is ready for starting a next process of vulcanization. First, a tire B to be vulcanized is placed on the lower die half 15 with the aid of a loader (not shown) and then a bladder C is inserted into the tire B while it is filled with a heating medium at a reduced pressure. Next, the upper die half 14 is lowered together with the beam 9 by means of the hydraulic cylinder unit 10 to which the beam 9 is fixedly secured. During the lowering of the upper die half 14 the projections 11b on the upper bolster 11 pass through the recessed parts between the adjacent projections 3b on the lock ring 3.

After completion of the lowering of the upper die half 14 it is confirmed that both the upper and lower die halves 14 and 15 are located in coaxial alignment, and then the lock ring 3 is rotated until the projections 3b is in complete engagement with the projections 11b and thus the intended locking is achieved. Then, the switching valve 32 is actuated by energizing the solenoid 33 and thereby pressurized hydraulic liquid is supplied into the hydraulic chamber 30 of the booster 28, whereby the lower bolster 5 is raised up by means of the piston 29, pressure intensified hydraulic liquid in the hydraulic chamber 26a and the ram 22. Thus, both the upper and lower halves 14 and 15 are tightly clamped together. After it is confirmed that the die assembly is closed with the predetermined clamping force, a heating medium at an elevated temperature and pressure is introduced into the bladder C, while the upper and lower platens 7 and 13 are supplied with another heating medium. Thus, the intended vulcanization is effected.

On completion of the vulcanization of the tire B the heating medium in the bladder C is first discharged and then the clamping force for the upper and lower die halves 14 and 15 is released by deenergizing the solenoid 33. Next, the lock ring 3 is rotated in the opposite direction by a distance equal to a half pitch of the projection 3b so as to allow the projections 3b to be disengaged from the projections 11b. After it is confirmed that unlocking is achieved, the upper die half 14 is raised up together with the beam 9 by actuating the hydraulic cylinder unit 10.

When the upper die half 14 is raised up to the predetermined height where the vulcanized tire B is to be removed, the bladder C is first removed from the tire B with the aid of a bladder handling mechanism (not shown) and then the tire is removed from the die assembly with the aid of an unloader (not shown). Thus, one cycle of vulcanization is completed.

Next, operation for die replacement will be described below. First, the upper die half 14 is lowered on the lower die half 15 and they are located in coaxial alignment with one another. Next, the tightening bolts for the upper die half 14 are disconnected therefrom and then the beam 9 is raised up with the upper die half 14 held on the lower die half 15. After disconnecting the tightening bolts from the lower die half 15 a complete set of upper and lower die halves 14 and 15 is removed from the vulcanizing press with the upper and lower bead rings 18 and 18 held on the corresponding die half. Next, another complete set of upper and lower die halves 14 and 15 with upper and lower bead rings 18 and 19 held thereon is placed on the lower platen 7 and then the lower die half 14 is firmly bolted to the latter. The beam 9 is lowered onto the upper die half 14 so as to allow it to be bolted to the upper bolster 11. In case that the replaced die assembly has a height higher than that of the removed one, the pilot operated check valve 27 is opened by energizing the solenoid 35 so that some volume of hydraulic liquid is discharged from the hydraulic chamber 26a. On the contrary, in case that the former has a height lower than that of the latter, the switching valve 34 is actuated by energizing the solenoid 36 and thereby pressurized hydraulic liquid is supplied from the hydraulic liquid source 43 through the pilot operated check valve 27 into the hydraulic chamber 26a, whereby the lower bolster 5 is raised up by means of the ram 22 until the required height adjustment is achieved. Then, the upper die half 14 is bolted to the upper bolster 11 and the beam 9 is raised up together with the upper die half 14. Thus, the intended die replacement is completed.

Since the vulcanizing press in accordance with the illustrated embodiment is constructed in the above-described manner, it is ensured that height adjustment is achieved by way of supply of hydraulic liquid into the hydraulic chamber 26a of the hydraulic cylinder unit A or discharge of the same therefrom which is effected by means of the switching valve 34 in any case when the replaced die assembly has a height higher than that of the removed one or the former has a height lower than that of the latter, while the upper and lower die halves 14 and 15 are placed on the lower platen 7 and the upper platen 13 is placed on them. As a result any die replacement is completed within a short period of time without any particular difficult. Moreover, since the pawls 3b and 11b in the locking mechanism are located at the predetermined position at all time irrespective of any die replacement, correct and reliable locking is ensured by the lock ring 3.

Further, since the hydraulic cylinder unit A includes the pilot operated check valve 27 and the booster 28 incorporated therein, operation required for die replacement is performed by way of supply or discharge (increase or decrease in volume) of hydraulic liquid into or from the casing 26 via the pilot operated check valve 27. Since the pilot operated check valve 27 is closed and supply of hydraulic liquid for the purpose of dis clamping is effected only into the booster 28 during vulcanization, it is ensured that a working stroke of the booster 28 is minimized to such an extent that a predetermined die clamping force is kept at all time. Owing to the arrangement as described above the opening of the die assembly is affected only by the working stroke of the booster 28 even when a malfunction such as trouble or failure with the switching valves and the pipings, stoppage of electrical current supply or the like occurs, resulting in a close opening developed between the upper and lower die halves 14 and 15. Thus, no rupture takes place with the cord reinforced tire B and the bladder C and therefore there is no danger that hot heating medium at a high pressure leaks from the inside. As a result vulcanization is effected safely. The above-mentioned advantageous features are obtainable also with other type of vulcanizing press such as autoclave type vulcanizing press and pot heater type vulcanizing press in which one or more sets of die assemblies are replaced together with vulcanized tires at every cycle of vulcanization.

The respective hydraulic cylinder units A are provided with the booster 28 and their hydraulic chamber 26a is adapted to be filled with hydraulic liquid having a higher viscosity such as grease or the like. Thus, it is possible to minimize a leakage from the packing 24 and the piston 29 and thereby safe operation is ensured with reduced fluctuation in working stroke of the ram 22. As a result it is possible to reduce working pressure of hydraulic liquid to be introduced via the piping 41 in comparison with that in the hydraulic chamber 26a required for die clamping. The reduction in working pressure of hydraulic liquid ensures increased reliability of the pipings or the like, resulting in safer operation. Thus, it is possible to operate the booster 28 using compressed air.

The centrally located mechanism for heating a tire to be vulcanized together with a bladder, the loader for placing a tire in position in the vulcanizing press prior to vulcanizing and the unloader for removing a vulcanized tire from the press are designed and constructed in the conventional manner and therefore their description will be not required.

The present invention has been described above with reference to the illustrated embodiment and it should be of course understood that it should be not limited only to this but it may be changed or modified in a suitable manner without any departure from the spirit and scope of the invention.

We claim:

1. A vulcanizing press for manufacturing tires which is constructed such that a molding die assembly is clamped by means of a plurality of hydraulic cylinder units, wherein the respective hydraulic cylinder units are provided with a booster for serving to pressurize hydraulic liquid to actuate a ram slidably contained in a hydraulic chamber and a pilot operated check valve for controlling supply of hydraulic liquid into said hydraulic chamber or discharge of the same therefrom.

* * * * *